(12) United States Patent
Sani

(10) Patent No.: US 12,724,881 B2
(45) Date of Patent: Sep. 1, 2026

(54) ANOMALY DETECTION

(71) Applicant: BRITISH TELECOMMUNICATIONS PUBLIC LIMITED COMPANY, London (GB)

(72) Inventor: Sadiq Sani, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 0 days.

(21) Appl. No.: 18/838,158

(22) PCT Filed: Feb. 7, 2023

(86) PCT No.: PCT/EP2023/052933
§ 371 (c)(1),
(2) Date: Aug. 13, 2024

(87) PCT Pub. No.: WO2023/156251
PCT Pub. Date: Aug. 24, 2023

(65) Prior Publication Data

US 2025/0156532 A1 May 15, 2025

(30) Foreign Application Priority Data

Feb. 16, 2022 (GB) ...................................... 2202046

(51) Int. Cl.
*G06F 21/55* (2013.01)
*G06N 3/0455* (2023.01)
*G06N 3/08* (2023.01)

(52) U.S. Cl.
CPC ......... *G06F 21/552* (2013.01); *G06N 3/0455* (2023.01); *G06N 3/08* (2013.01)

(58) Field of Classification Search
CPC ........ G06N 3/0455; G06N 3/08; G06N 3/088; G06N 3/09; G06F 21/552; H04L 63/1408
See application file for complete search history.

(56) References Cited

U.S. PATENT DOCUMENTS

2020/0076840 A1 3/2020 Peinador et al.
2020/0076841 A1 3/2020 Hajimirsadeghi et al.
2020/0210808 A1* 7/2020 Dong .................. G06N 3/0895

FOREIGN PATENT DOCUMENTS

CN 110263807 A 9/2019
CN 111585997 A 8/2020
(Continued)

OTHER PUBLICATIONS

International Preliminary Report on Patentability dated Aug. 29, 2024, issued for International Application No. PCT/EP2023/052933 (8 pages).

(Continued)

*Primary Examiner* — Olugbenga O Idowu
(74) *Attorney, Agent, or Firm* — Nixon & Vanderhye P.C.

(57) ABSTRACT

A computer implemented method for detecting anomalous behaviour within a system is provided. The method generates an autoencoder for detecting anomalous behaviour within the system. The method also generates a classifier for predicting a classification of behaviour within the system. An input to the classifier comprises an output from one or more internal layers of the autoencoder. The method jointly trains the autoencoder and the classifier using a set of training data comprising a plurality of sample inputs that represent normal behaviour within the system and a plurality of sample inputs that represent anomalous behaviour within the system. The training is based on an output from a joint loss function that is configured to combine any reconstruction loss from the autoencoder with any prediction error from the classifier. The joint loss function is further configured to negate any reconstruction loss of the autoencoder in response to the sample input representing anomalous behaviour within the system. The trained autoencoder is used to (Continued)

classify a behaviour of the system as being normal or anomalous.

13 Claims, 5 Drawing Sheets

(56) References Cited

FOREIGN PATENT DOCUMENTS

| | | | |
|---|---|---|---|
| CN | 113032778 | A | 6/2021 |
| GB | 2593735 | A | 10/2021 |

OTHER PUBLICATIONS

International Search Report and Written Opinion of the ISA for PCT/EP2023/052933 dated Apr. 18, 2023, 14 pages.

Combined Search and Examination Report for GB Application No. 2202046.5 dated Oct. 11, 2022, 11 pages.

Zhaomin Chen et al., "Autoencoder-based Network Anomaly Detection", Wireless Telecommunications Symposium (WTS), IEEE, 2018, 5 pages.

Michael Crawshaw et al., "Multi-Task Learning With Deep Neural Networks: A Survey", arXiv preprint arXiv:2009.09796, 2020, 43 pages.

Yueyi Yang et al., "An end-to-end denoising autoencoder-based deep neural network approach for fault diagnosis of analog circuit", Analog Integrated Circuits and Signal Processing, 2021, 12 pages.

* cited by examiner

ANOMALY DETECTION

CROSS-REFERENCE TO RELATED APPLICATIONS

This application is the U.S. national phase of International Application No. PCT/EP2023/052933 filed Feb. 7, 2023 which designated the U.S. and claims priority to GB 2202046.5 filed Feb. 16, 2022, the entire contents of each of which are hereby incorporated by reference.

FIELD OF THE INVENTION

The present invention relates to detecting anomalous behaviour within a system. In particular, the present invention relates to the training of an autoencoder to classify behaviour of the system as being normal or anomalous.

BACKGROUND TO THE INVENTION

Anomaly detection is concerned with identifying activity (i.e. behaviour) within a system that is unexpected when the system is operating normally. Any detected anomalies may relate to threats or faults impacting the system. Anomaly detection is typically employed to monitor the system and provide notifications of any anomalies that are detected to help identify threats and/or faults within the system. This approach differs from other approaches for monitoring a system in so far as it doesn't rely on having knowledge of the specific threats and/or faults that the system faces. Instead, anomaly detection makes use of knowledge of the system's normal behaviour to spot unusual activity. That is to say, when considering whether some activity is normal or anomalous, anomaly detection approaches seek to determine whether it matches the system's normal behaviour. Meanwhile, other approaches seek to determine whether the activity matches the characteristics of specific known threats and/or fault conditions for the system. As a result, anomaly detection can be particularly useful for monitoring complicated systems where the faults and/or threats that are faced are not fully known, or where novel faults and/or threats may appear.

Machine learning techniques are commonly used to generate a model of a system's normal behaviour for use in anomaly detection. For example, an autoencoder may be trained using unsupervised learning on a set of training data that represents normal activity within the system. As will be understood by those skilled in the art, training an autoencoder on a set of data configures the autoencoder in such a way that it is able to faithfully reproduce inputs having the same characteristics as the training data, but will not produce a faithful reproduction of input data having different characteristics from the training data. This is a result of the structure of autoencoder, which is typically formed as an artificial neural network having multiple layers. In particular, internal layers of the artificial neural network are sized so that they contain fewer artificial neurons than the input and output layers. Therefore, as the data is passed from the input layer, through the internal layers and to the output layers, it is necessarily encoded (internally) into a lower dimensional space (as a result of the fewer number of artificial neurons in the internal layers) and then decoded back to the original dimensional space at the output layer. This internal representation is formed during training to include the most significant components of the training data that are most representative of the data in the training set, whilst excluding less significant components or noise. The data that is provided at the output layer of the autoencoder is therefore a reconstruction of the data that was provided at the input layer. The difference between the reconstruction of the data and the actual data that was input provides a measure of similarity between the input data and the characteristics of the training data. This difference is commonly referred to as the reconstruction loss or error. For example, where the input data is similar to the training data, such as where the input data represents normal activity for a system, the reconstruction loss is expected to be low. This is because the lower dimensional space to which the autoencoder encodes the input data is expected to be well suited to representing the input data, as it will have similar significant components to the training data. This means that the reconstruction of the input is likely to be reasonably faithful. Conversely, where the input data is different from the training data, such as where the input data represents anomalous activity for a system, the reconstruction loss is expected to be higher. This is because the lower dimensional space is expected to be less well suited to representing the input data, as it is likely to have different significant components from the training data, resulting in a loss of information when the input data is encoded to the lower dimensional space. This means that the reconstruction of the input is likely to be less faithful.

Anomaly detection can be used to monitor a wide range of different types of system. As an example, anomaly detection is of interest in the fields of network and computer security as a way of countering the novel threats affecting networks and/or computer systems at an ever-increasing rate. An anomaly detector can be incorporated into so-called intrusion detection systems (IDSs) to alert network administrators of anomalies that may be threats to a network (or to computer systems within the network). In some cases, such systems may also automatically take action to prevent or mitigate the threat that has been detected. These systems are commonly referred to as intrusion prevention systems (IPSs).

SUMMARY OF THE INVENTION

In a first aspect of the present invention, there is provided a computer implemented method for detecting anomalous behaviour within a system, the method comprising: generating an autoencoder for detecting anomalous behaviour within the system; generating a classifier for predicting a classification of behaviour within the system, wherein an input to the classifier comprises an output from one or more internal layers of the autoencoder; jointly training the autoencoder and the classifier using a set of training data comprising a plurality of sample inputs that represent normal behaviour within the system and a plurality of sample inputs that represent anomalous behaviour within the system, the training being based on an output from a joint loss function that is configured to combine any reconstruction loss from the autoencoder with any prediction error from the classifier, wherein the joint loss function is further configured to negate any reconstruction loss of the autoencoder in response to the sample input representing anomalous behaviour within the system; and using the trained autoencoder to classify a behaviour of the system as being normal or anomalous.

By jointly training a classifier together with an autoencoder, an element of supervised learning can be introduced into the training of the autoencoder. This means that the training of the autoencoder reflects some knowledge of known anomalies, rather than simply relying on knowledge of the system's normal behaviour. This approach causes the autoencoder to learn a different internal representation (to which the input data is encoded and then subsequently decoded to reconstruct the input data at the output) which is better able to discriminate between anomalous and normal behaviour, resulting in improved detection of anomalies when the trained autoencoder is subsequently used for this purpose.

In a second aspect of the present invention, there is provided a computer system comprising a processor and a memory storing computer program code for performing a method according to the first aspect.

In a third aspect of the present invention, there is provided a computer program which, when executed by one or more processors, is arranged to carry out a method according to the first aspect.

BRIEF DESCRIPTION OF THE FIGURES

Embodiments of the present invention will now be described by way of example only, with reference to the accompanying drawings, in which.

DETAILED DESCRIPTION OF EMBODIMENTS

Figure 1:
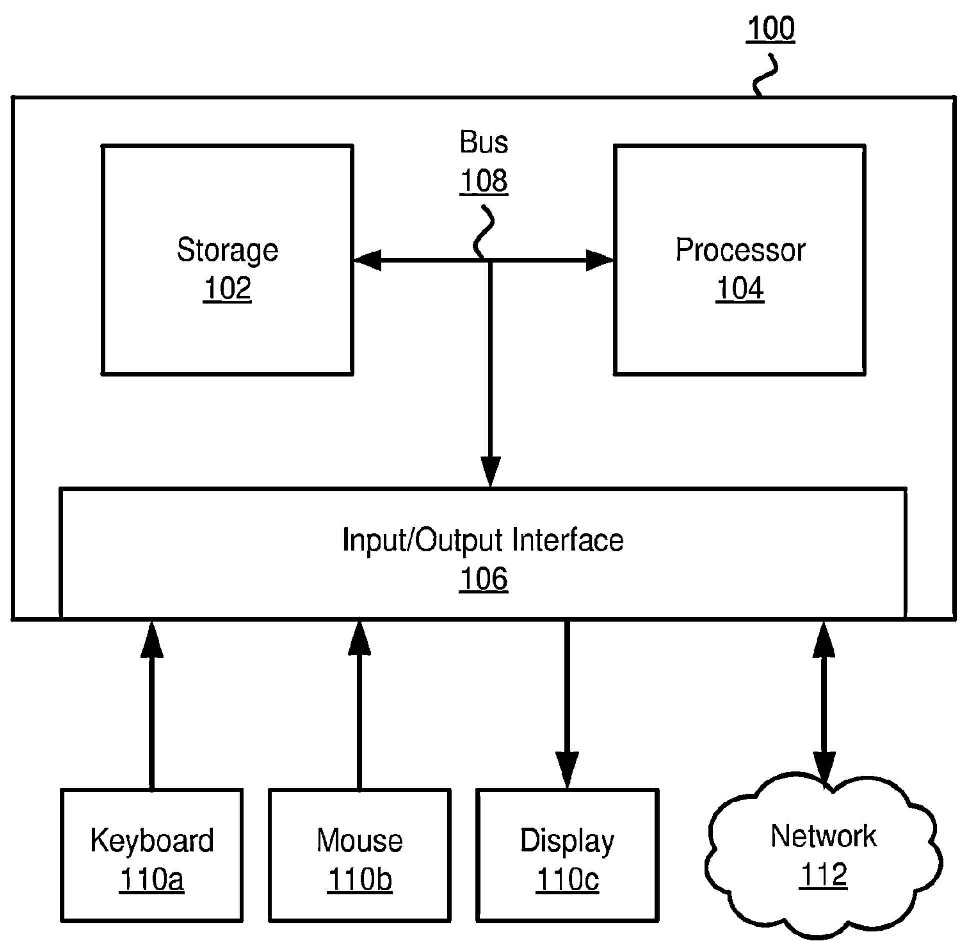
FIG. 1 is a block diagram of a computer system suitable for the operation of embodiments of the present invention.

FIG. 1 is a block diagram of a computer system 100 suitable for the operation of embodiments of the present invention. The system 100 comprises: a storage 102, a processor 104 and an input/output (I/O) interface 106, which are all communicatively linked over one or more communication buses 108.

The storage (or storage medium or memory) 102 can be any volatile read/write storage device such as a random access memory (RAM) or a non-volatile storage device such as a hard disk drive, magnetic disc, optical disc, ROM and so on. The storage 102 can be formed as a hierarchy of a plurality of different storage devices, including both volatile and non-volatile storage devices, with the different storage devices in the hierarchy providing differing capacities and response times, as is well known in the art.

The processor 104 may be any processing unit, such as a central processing unit (CPU), which is suitable for executing one or more computer programs (or software or instructions or code). These computer programs may be stored in the storage 102. During operation of the system, the computer programs may be provided from the storage 102 to the processor 104 via the one or more buses 108 for execution. One or more of the stored computer programs, when executed by the processor 104, cause the processor 104 to carry out a method according to an embodiment of the invention, as discussed below (and accordingly configure the system 100 to be a system 100 according to an embodiment of the invention).

The input/output (I/O) interface 106 provides interfaces to devices 110 for the input or output of data, or for both the input and output of data. The devices 110 may include user input interfaces, such as a keyboard 110*a* or mouse 110*b* as well as user output interfaces such as a display 110*c*. Other devices, such a touch screen monitor (not shown) may provide means for both inputting and outputting data. The input/output (I/O) interface 106 may additionally or alternatively enable the computer system 100 to communicate with other computer systems via one or more networks 112. It will be appreciated that there are many different types of I/O interface that may be used with computer system 100 and that, in some cases, computer system 100 may include more than one I/O interface. Furthermore, there are many different types of device 100 that may be used with computer system 100. The devices 110 that interface with the computer system 100 may vary considerably depending on the nature of the computer system 100 and may include devices not explicitly mentioned above, as would be apparent to the skilled person. For example, in some cases, computer system 100 may be a server without any connected user input/output devices. Such a server may receive data via a network 112, carry out processing according to the received data and provide the results of the processing via a network 112.

It will be appreciated that the architecture of the system 100 illustrated in FIG. 1 and described above is merely exemplary and that other computer systems 100 with different architectures (such as those having fewer components, additional components and/or alternative components to those shown in FIG. 1) may be used in embodiments of the invention. As examples, the computer system 100 could comprise one or more of: a personal computer; a laptop; a tablet; a mobile telephone (or smartphone); a television set (or set top box); a games console; an augmented/virtual reality headset; a server; or indeed any other computing device with sufficient computing resources to carry out a method according to embodiments of this invention.

Figure 2:
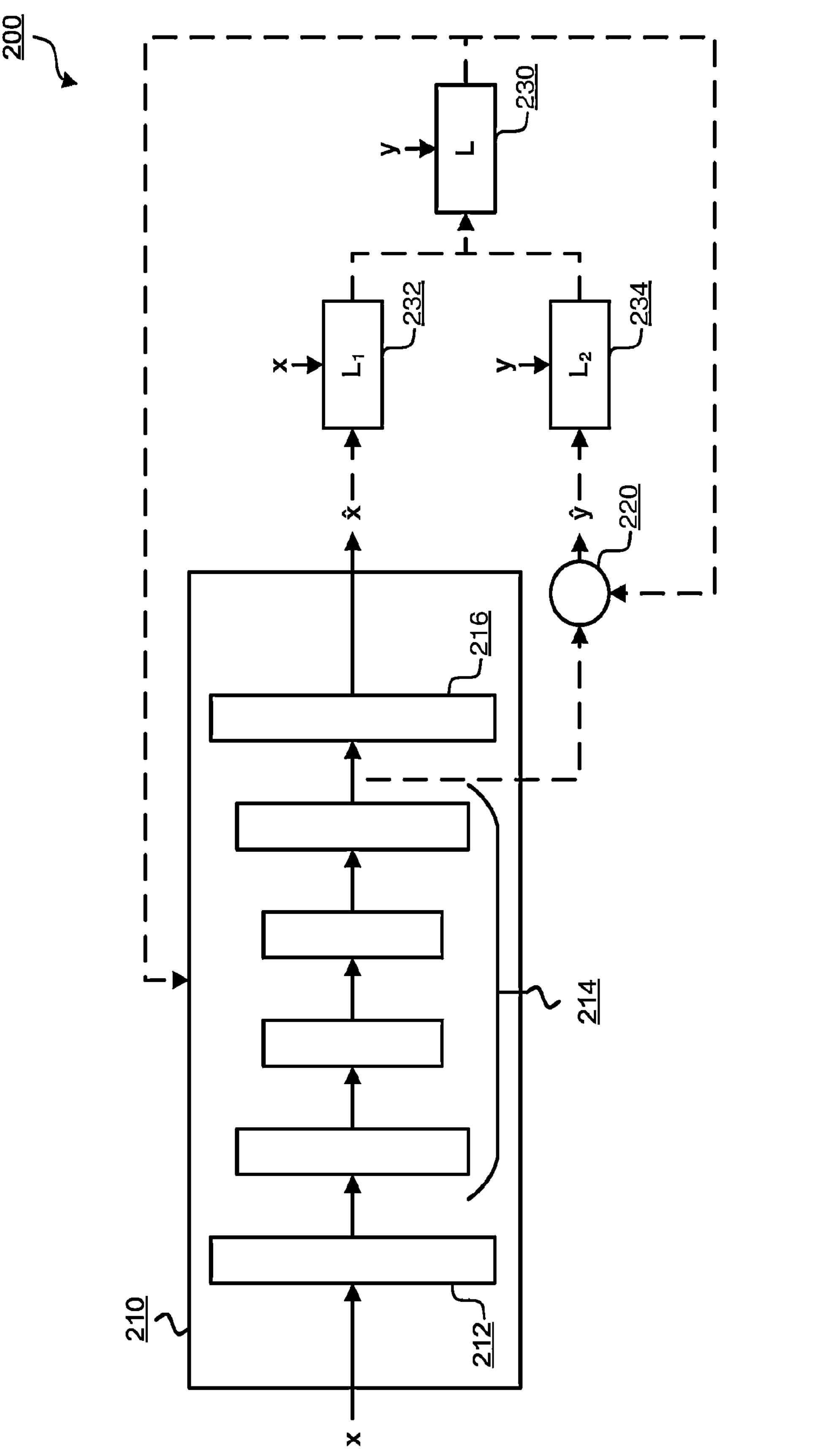
FIG. 2 is a block diagram illustrating an arrangement of components for training an autoencoder to detect anomalous behaviour with a system in accordance with embodiments of the invention.

FIG. 2 is a block diagram illustrating an arrangement 200 of components for training an autoencoder 210 to detect anomalous behaviour with a system in accordance with embodiments of the invention. The arrangement 200 comprises an autoencoder 210, a classifier 220 and a joint loss function 230.

The autoencoder 210 is formed from an artificial neural network comprising artificial neurons arranged in a plurality of layers including an input layer 212, one or more internal layers 214 and an output layer 216.

The artificial neurons of the input layer 212 are interconnected with the neurons of a first internal layer 214. Similarly, the artificial neurons of each internal layer 214 are interconnected with the artificial neurons of any subsequent internal layer 214 in turn. Finally, the artificial neurons of a last internal layer 214 are interconnected with the artificial neurons of the output layer 216. Accordingly, the artificial neurons of each internal layer 214 are interconnected with the artificial neurons of two other layers of the artificial neural network, namely a preceding layer from which data is received and a subsequent layer to which data is provided. In cases where the autoencoder 210 comprises a single internal layer 214, these two other layers will be the input layer 212 and the output layer 216. However, in cases where the autoencoder 210 comprises a plurality of internal layers 214, at least one of these layers will be another one of the internal layers 214. As will be appreciated by those skilled in the art, the interconnection of the artificial neurons in this manner results in data flowing from the input layer 212 through each of the internal layers 214 in turn before reaching the output layer 216, as indicated by the arrows on FIG. 2.

The input layer 212 and the output layer 216 are sized according to the size of an input x that the autoencoder 210 is configured to receive. That is to say, both the input layer 212 and the output layer 216 have a sufficient number of artificial neurons to receive all the elements or bits that could be included in the input x. Since the input layer 212 and the output layer 216 have the same dimension (i.e. number of artificial neurons), an output x that is provided by the output layer 216 as an output from the autoencoder 210 will have the same dimension as the input x to the autoencoder 210.

The internal layers 214 are sized such that they are smaller than the input layer 212 and output layer 216. As will be appreciated by those with knowledge of conventional autoencoders, this structure is intended to cause the autoencoder 210 to encode the input x that it receives at the input layer 212 into an internal representation that is a lower dimensional representation of the input x. A reconstruction x of the input x is then generated at the output layer 216 of the autoencoder 210 by decoding the lower dimensional internal representation back into the original dimensions of the input x. In general, where a plurality of internal layers 214 are present, this is achieved by configuring those layers such that the dimensions of each layer decrease in turn until a middle layer(s) is reached, following which the dimensions of each layer increase again in turn. Typically, the dimensions of the internal layers 214 will be configured to be symmetrical about the middle layer(s), such that the dimension of a first internal layer 214 is the same as the last internal layer 214 and the dimension of a second internal layer 214 is the same as the penultimate internal layer 214 and so on. This is illustrated in FIG. 2 by the relative heights of the rectangles representing the internal layers 214. Of course, it will be appreciated that such an arrangement is not strictly necessary and that any suitable arrangement and sizing of the internal layers that causes the artificial neural network to function as an autoencoder (i.e. that results in an input being encoded to a lower dimensional representation and then decoded back again) may be used instead.

The classifier 220 is configured to receive data from one more of the internal layers 214 of the autoencoder 210 and generate a prediction probability y as to whether activity represented by the data x that was input to the autoencoder 210 is normal or anomalous.

Any suitable means for implementing a classifier to produce a prediction probability of a binary classification (i.e. 'normal' and 'anomalous') may be used. In the simplest case, the classifier 220 may be implemented by a single artificial neuron. However, in other cases, more complex artificial neural networks having a greater number of artificial neurons may be used to implement the classifier 220.

In some cases, the input to the classifier 220 may be taken from a single internal layer 214 of the autoencoder 210. That is to say, the input all comes from the same internal layer 214 of the autoencoder 210. For example, the input may comprise the output from the last internal layer 214 of the autoencoder 210 (i.e. the internal layer 214 that immediate precedes the output layer 216). Alternatively, the input to the classifier 220 may comprise the output from the innermost internal layer 214 (i.e. the internal layer 214 which generates the lowest dimensional representation of the input x within the autoencoder 210). Of course, in other cases, the input to the classifier 220 may be taken from a plurality of internal layers 214 of the autoencoder 210. For example, the input may comprise the output from both the last internal layer 214 and the innermost internal layer 214.

By using the output from one or more of the internal layers 214 of the autoencoder 210 as the input to the classifier 220, the input to the classifier 220 comprises a lower dimensional representation of the input x. Conceptually, this arrangement also means that a number of layers of the autoencoder 210 are effectively shared with the classifier 220. That is to say, there are a number of layers of the autoencoder 210 which are common to both the autoencoder 210 and the classifier 220. Similarly, there remain some layers of the autoencoder 210 which are not shared with the classifier 220 (including at least the output layer 216).

The joint loss function 230 is configured to determine a joint loss L for both the autoencoder 210 and the classifier 220 by combining any reconstruction loss $L_1$ from the autoencoder 210 with any prediction error $L_2$ from the classifier 220.

The joint loss function 230 is used for jointly training the autoencoder 210 and the classifier 220. That is to say, during training, the joint loss L is used by a suitable backpropagation algorithm to adjust the weights between artificial neurons in both the autoencoder 210 and the classifier 220 (as well as between the autoencoder 210 and classifier 220) during each iteration of learning with the goal of reducing the joint loss L that is produced by the autoencoder 210 and the classifier 220.

The reconstruction loss $L_1$ is obtained from a reconstruction loss function 232 that determines the reconstruction loss $L_1$ for the autoencoder 210. Specifically, the reconstruction loss function 232 determines the reconstruction loss $L_1$ by determining the difference between the original input x and the reconstruction x of the input produced by the autoencoder 210, e.g.:

$$L_1 = x - \hat{x}$$

The prediction error $L_2$ is determined from a prediction error function 234 that determines the prediction error for the classifier 220. Specifically, the prediction error function 234 determines the difference between a known label y for the input and the prediction y output by the classifier 220, e.g.:

$$L_2 = y - \hat{y}$$

The joint loss function 230 is configured to combine the reconstruction loss $L_1$ and the prediction error $L_2$ in such a way that the reconstruction loss $L_1$ of the autoencoder is negated when the known label y for the input x indicates that x is data representing an anomalous activity within the system, e.g.:

$$L = (1 - y)L_1 + L_2$$

As will be appreciated, in this exemplary equation for calculating the joint loss L, the label y takes a value of either 1 or 0. Specifically, the label y will have a value of 1 if the input x represents an anomalous activity and a value of 0 if the input x represents a normal activity. As a result, the reconstruction loss $L_1$ will be negated for inputs x representing anomalous activities. In such cases, the joint loss L corresponds to the prediction error $L_2$. In other words, the joint loss function 230 is a function of any reconstruction loss $L_1$ of the autoencoder 210 and any prediction error $L_2$ from the classifier 220 in response to the sample input x representing normal behaviour within the system (e.g. where y=0), and is a function of any prediction error $L_2$ from the classifier 220 in response to the sample input x representing anomalous behaviour (e.g. where y=1).

Of course, it will be appreciated that the equations discussed above are merely exemplary and that other equivalent calculations may be performed instead to combine the reconstruction loss $L_1$ and prediction error $L_2$ in such a way that the reconstruction loss $L_1$ is negated for sample inputs x that represent anomalous activities.

Similarly, although the joint loss function 230, reconstruction loss function 232 and prediction error function 234 have been shown as separate elements in FIG. 2, it will be appreciated that this is merely intended to more clearly convey the concept of the invention. These functions need not be implemented separately from each other and may be combined into a single function, as would be readily apparent to the skilled person.

Figure 3:
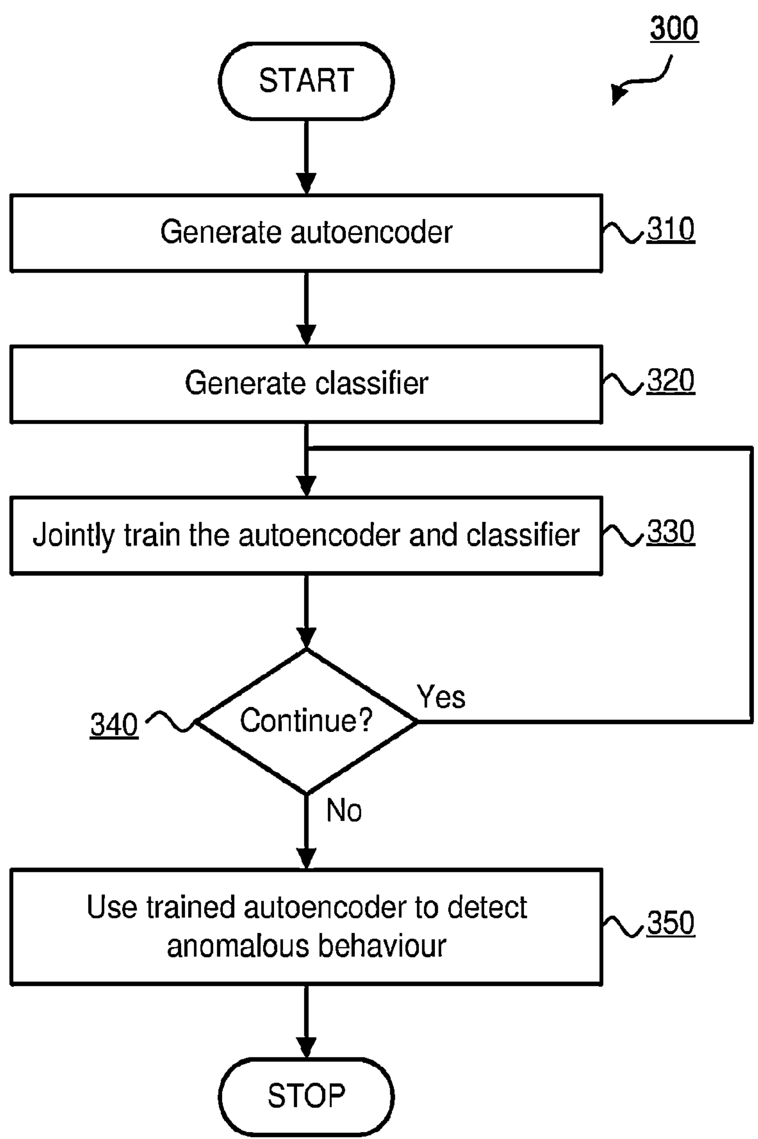
FIG. 3 is a flowchart illustrating a method for detecting anomalous behaviour within a system according to embodiments of the invention.

The arrangement 200 illustrated in FIG. 2 will now be discussed further in conjunction with FIG. 3, which is a flowchart illustrating a method 300 for detecting anomalous behaviour within a system according to embodiments of the invention. The method 300 may be performed by any suitable computer system, such as computer system 100.

As an example, the system to be monitored may be a computer system or a computer network, in which case the anomalous behaviour to be detected may be representative of an attack on the computer system or the computer network. Discussion of this exemplary application of the invention to a computer system or a computer network will be continued through the remainder of the description of this invention. However, it will be appreciated that the invention may equally be applied to other scenarios where anomaly detection is useful, as will be recognised by the skilled person.

At an operation 310, the method 300 generates the autoencoder 210. As will be appreciated by those skilled in the art, operation 310 may, for example, comprise defining a data structure in the storage 102 of the computer system 100 representing an artificial neural network configured to function as an autoencoder 210.

At an operation 320, the method 300 generates the classifier 220. Again, operation 320 may, for example, comprise defining a data structure in the storage 102 of the computer system 100 representing the classifier 220, wherein the definition specifies that the input for the classifier 220 is the output from one or more layers of the autoencoder 210. Of course, it makes little practical difference whether these data structures are defined as two separate data structures with data being passed from one (the autoencoder 210) to the other (the classifier 220) or as a single composite data structure that defines the same functionality. Furthermore, when created as a single composite data structure, operations 310 and 320 are effectively combined.

At an operation 330, the method 300 jointly trains the autoencoder 210 and classifier 220. This training is performed based on a set of training data that comprises sample inputs of data representing both 'normal' and 'anomalous' activities occurring within the system. This is in contrast to the conventional training of an autoencoder which is performed using a set of training data that solely represents 'normal' activities occurring within the system.

Returning to the exemplary application of the invention to monitor for anomalies occurring within a computer system or computer network, the training data represents activities occurring within such systems including examples of both 'normal' activities and 'anomalous' activities. In such applications, the data could, for example, be representative of interactions occurring between components within a computer system (e.g. memory reads) or between computer systems within a network. For example, NetFlow data may be used as a representation of interactions occurring between computer systems in a network.

As already discussed, this training involves providing the sample inputs in the set of training data as an input x to the autoencoder 210 and then using a backpropagation algorithm to modify the configuration of the autoencoder 210 and classifier 220 to minimise a joint loss L determined by the joint loss function 230. Since each iteration of training may modify weights in both the autoencoder 210 and classifier 220, the autoencoder 210 and classifier 220 are considered to be jointly (or simultaneously) trained.

Because the joint loss function 230 operates in such a way that the reconstruction loss $L_1$ of the autoencoder 210 is negated (or cancelled) when the sample input x represents anomalous activity within the system, the training of the autoencoder 210 still functions to cause the autoencoder 210 to produce a faithful reproduction x of inputs x when those inputs represent 'normal' activity within the system. However, the operation of the joint loss function 230 also causes the training to proceed in a manner which enables those input samples representing anomalous activity in the system to be classified correctly by the classifier 220. The joint training of the autoencoder 210 and the classifier 220 in this way causes the autoencoder 210 to be configured in a way that is better able to discriminate between data representing 'anomalous' activity from that which represents 'normal' activity for the system. That is to say, the autoencoder 210 learns a more discriminative internal encoding for the 'normal' activity of the system. This is a result of the use of the classifier to incorporate an element of supervised learning regarding typical 'anomalies' for the system. It is generally intended (but not required) that the proportion of samples for inputs representing 'anomalous' activities within the training data is relatively low. Accordingly, the invention may be considered as providing a semi-supervised approach for training the autoencoder 210 where predominantly unsupervised learning is supplemented with some supervised learning. This allows an improvement in performance to be achieved without requiring the significant effort to obtain a large volume of labelled data that is required by fully supervised learning.

At an operation 340, the method 300 determines whether to continue jointly training the autoencoder 210 and classifier 220. As will be appreciated by those skilled in the art, the training may proceed for a certain number of iterations, or until a certain level of accuracy is achieved when classifying a test set of data. In some cases, the training may be performed continually or periodically at the same time that the autoencoder 210 is being used to detect anomalies in a system. For example, data may be verified as being 'normal' or 'anomalies' during use of the autoencoder 210, added to the training data and used to retrain the autoencoder 210.

At an operation 350, the method 300 uses the trained autoencoder 210 to detect anomalous behaviour occurring in the system. Operation 350 will now be discussed further in conjunction with FIG. 4, which is a flowchart illustrating a method 400 for using a trained autoencoder 210 to detect anomalous behaviour according to embodiments of the invention, such as may be performed by operation 350.

At an operation 410, the method 400 receives data representing activity occurring within the system that is to be classified. For example, NetFlow data may be received representing interaction between computer systems in a computer network. This data is provided as the input x to the input layer 212 of the trained autoencoder 210. The method 400 then proceeds to an operation 420.

At operation 420, the method 400 determines a reconstruction loss $L_1$ of the autoencoder 210. This is determined in the same way as discussed in relation to the reconstruction loss function 232, i.e. by determining the difference between the input x and the reconstruction x of the input produced by the trained autoencoder 210. The method 400 then proceeds to an operation 430.

At operation 430, the method 400 determines whether the reconstruction loss $L_1$ is greater than a predetermined threshold. If the reconstruction loss $L_1$ is not greater than this predetermined threshold, the method 400 proceeds to an operation 440. Otherwise, if the reconstruction loss $L_1$ is greater than the predetermined threshold, the method 400 proceeds to an operation 450.

At operation 440, in response to determining that the reconstruction loss L is less than (or equal to) the predetermined threshold at operation 430, the method 400 classifies the activity as being 'normal' behaviour for the system. The method 400 then proceeds to an operation 470.

At operation 450, in response to determining that the reconstruction loss is greater than the predetermined threshold at operation 430, the method 400 classifies the activity as being 'anomalous' behaviour for the system. Where the system being monitored is a computer system or a computer network, for example, this may indicate that the activity is an attack on the computer system or network. The method 400 then proceeds to an optional operation 460. Alternatively, where the method 400 does not include optional operation 460, the method 400 proceeds to operation 470.

At operation 460, the method 400 causes one or more predetermined actions to be taken in respect of the system. These actions are intended to mitigate any negative effects of the anomalous behaviour on the system. For example, where the system being monitored is a computer system or a computer network, the predetermined actions may include one or more of: providing a notification of the anomalous activity; causing further analysis of the anomalous activity to be carried out; automatically isolating a computer system associated with the anomalous activity from a network to prevent that computer system from continuing to communicate via the network; carrying out an enhanced level of scanning in respect of a computer system associated with the anomalous activity. Having carried out any predetermined action(s) in response to a determination that an activity is 'anomalous', the method 400 proceeds to operation 470.

At operation 470, the method 400 determines whether it should continue operating. That is to say, whether anomaly detection is required for further activities within the system. If continued operation of method 400 is required, it returns to operation 410 to perform another iteration of operations 410-470 in respect of input data representing a further activity occurring within the system. Otherwise, the method 400 ends. Similarly, having completed method 400 at operation 350, the method 300 ends.

It will be appreciated that it is generally expected (although not necessary) for method 400 to operate continually over a period of time in order to detect any anomalous activities occurring with the system during that time. In some cases, the method 400 may be performed in respect of any activities occurring within the system during that time. In other cases, the activities occurring within the system may be filtered by some other process, such that method 400 operates on a subset of the activities occurring within the system during that time.

Figure 4:
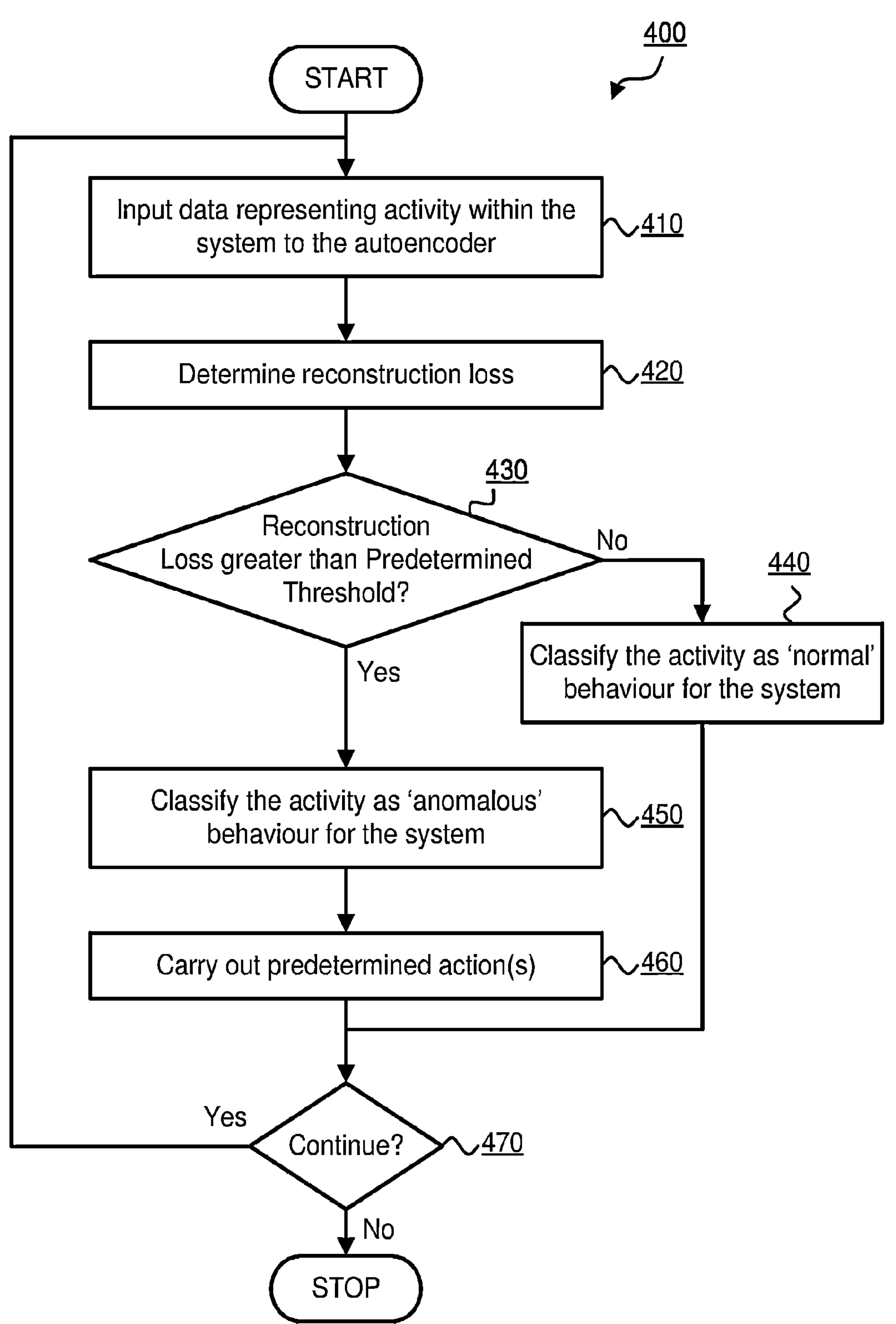
FIG. 4 is a flowchart illustrating a method for using a trained autoencoder to detect anomalous behaviour according to embodiments of the invention.

Although not shown in FIG. 4, it is also possible for one or more predetermined actions to be taken in response to a 'normal' classification of an activity (i.e. following operation 440 in method 400).

As will be apparent from the discussion of the method 400 illustrated in FIG. 4, only the output from the autoencoder 210 is needed to identify anomalies in the system being monitored. The output from the classifier 220 is only required as part of the training process for the autoencoder 210. That is to say, the classification of the behaviour the system can be performed by the autoencoder 210 separately (or independently) from the classifier 220.

Figure 5:
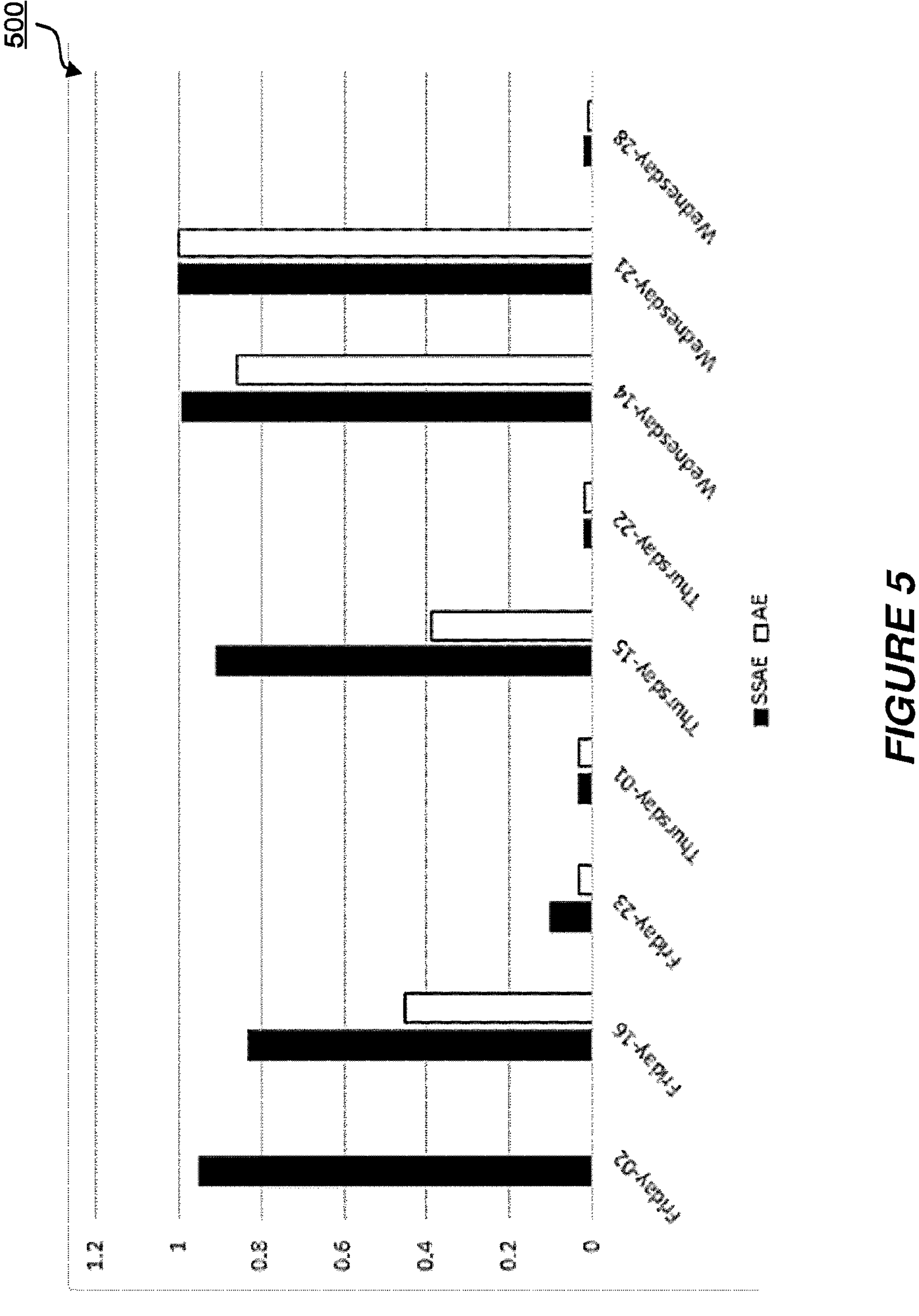
FIG. 5 is a chart showing the results of an evaluation of the performance provided by an embodiment of the invention.

FIG. 5 is a chart 500 showing the results of an evaluation of the performance provided by an embodiment of the invention. This evaluation made use of the CSE-CIC-IDS2018 dataset provided by the Communications Security Establishment (CSE) and the Canadian Institute for Cybersecurity (CIC) currently available at https://www.unb.ca/cic/datasets/ids-2018.html. This dataset was used to train two autoencoders: a first autoencoder being trained using conventional unsupervised learning techniques and a second autoencoder being trained using the semi-supervised learning technique of the present invention. The architecture of the two autoencoders was the same, with the exception that the second autoencoder additionally comprised a prediction output (i.e. classifier) to enable the use of the semi-supervised learning technique. The semi-supervised learning technique made use of 100 labelled anomalies to supplement the unsupervised learning. The chart 500 shows the detection performance (the macro averaged F1-score) for both autoencoders. The results for the first autoencoder (trained using conventional unsupervised learning) are labelled 'AE'. The results for the second autoencoder (trained using the semi-supervised learning technique of the present invention) are labelled 'SSAE'. As can be seen from FIG. 5, the 'SSAE' autoencoder produced by the semi-supervised learning technique of the present invention outperforms the 'AE' autoencoder trained by conventional unsupervised learning techniques on 5 out of 9 datasets (whilst matching the performance on the remaining 4 datasets). Notably, on the 'Friday-02' dataset in particular, the 'SSAE' autoencoder is able to achieve a 95% accuracy in detecting anomalies while AE has 0% accuracy, representing a substantial improvement. Similar improvements in performance can also be observed on the 'Friday-16', 'Friday-23', 'Thursday-15' and 'Wednesday-14' datasets. Meanwhile, on the remaining datasets (i.e. the 'Thursday-01', 'Thursday-22', 'Wednesday-21', and 'Wednesday-28' datasets), a similar level of performance is achieved by both autoencoders.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example. Suitably, the computer program is stored on a carrier medium in machine or device readable form, for example in solid-state memory, magnetic memory such as disk or tape, optically or magneto-optically readable memory such as compact disk or digital versatile disk etc., and the processing device utilises the program or a part thereof to configure it for operation. The computer program may be supplied from a remote source embodied in a communications medium such as an electronic signal, radio frequency carrier wave or optical carrier wave. Such carrier media are also envisaged as aspects of the present invention. It will be understood by those skilled in the art that, although the present invention has been described in relation to the above described example embodiments, the invention is not limited thereto and that there are many possible variations and modifications which fall within the scope of the invention. The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer implemented method for detecting anomalous behaviour within a system, the method comprising:

generating an autoencoder for detecting anomalous behaviour within the system;

generating a classifier for predicting a classification of behaviour within the system, wherein an input to the classifier comprises an output from one or more internal layers of the autoencoder;

jointly training the autoencoder and the classifier using a set of training data comprising a plurality of sample inputs that represent normal behaviour within the system and a plurality of sample inputs that represent anomalous behaviour within the system, the training being based on an output from a joint loss function that is configured to combine any reconstruction loss from the autoencoder with any prediction error from the classifier, wherein the joint loss function is further configured to negate any reconstruction loss of the autoencoder in response to the sample input representing anomalous behaviour within the system; and using the trained autoencoder to classify a behaviour of the system as being normal or anomalous.

2. The method of claim 1, wherein the autoencoder comprises a plurality of internal layers.

3. The method of claim 1, wherein the input to the classifier comprises the output from an internal layer of the autoencoder that immediately precedes the output layer.

4. The method of claim 1, wherein the input to the classifier consists of the output from a single internal layer of the autoencoder.

5. The method of claim 1, wherein the system is a computer network and the behaviour to be classified is an interaction between computer systems within the computer network.

6. The method of claim 5, wherein a classification of the behaviour as anomalous indicates an attack on the computer network.

7. A computer system comprising a processor and a memory storing computer program code which upon execution by the processor causes the computer system to detect anomalous behaviour within a system by being at least configured to:

generate an autoencoder for detecting anomalous behaviour within the system;

generate a classifier for predicting a classification of behaviour within the system, wherein an input to the classifier comprises an output from one or more internal layers of the autoencoder;

jointly train the autoencoder and the classifier using a set of training data comprising a plurality of sample inputs that represent normal behaviour within the system and a plurality of sample inputs that represent anomalous behaviour within the system, the training being based on an output from a joint loss function that is configured to combine any reconstruction loss from the autoencoder with any prediction error from the classifier, wherein the joint loss function is further configured to negate any reconstruction loss of the autoencoder in response to the sample input representing anomalous behaviour within the system; and use the trained autoencoder to classify a behaviour of the system as being normal or anomalous.

8. A non-transitory computer-readable storage medium storing a computer program which, when executed by one or more processors, is arranged to carry out the method according to claim 1.

9. The computer system of claim 7, wherein the autoencoder comprises a plurality of internal layers.

10. The computer system of claim 7, wherein the input to the classifier comprises the output from an internal layer of the autoencoder that immediately precedes the output layer.

11. The computer system of claim 7, wherein the input to the classifier consists of the output from a single internal layer of the autoencoder.

12. The computer system of claim 7, wherein the system is a computer network and the behaviour to be classified is an interaction between computer systems within the computer network.

13. The computer system of claim 12, wherein a classification of the behaviour as anomalous indicates an attack on the computer network.

* * * * *